US007686124B2

(12) United States Patent
Hublart et al.

(10) Patent No.: US 7,686,124 B2
(45) Date of Patent: Mar. 30, 2010

(54) VEHICLE STEERING SYSTEMS

(75) Inventors: Bernard Hublart, Beauvais (FR);
Cedric Deman, Savignies (FR);
Malcolm Shute, St. Germain la Poterie (FR); Vince Chauvel, St. Gilles (FR)

(73) Assignee: AGCO SA, Beauvais (FR)

( * ) Notice: Subject to any disclaimer, the term of this patent is extended or adjusted under 35 U.S.C. 154(b) by 326 days.

(21) Appl. No.: 11/847,931

(22) Filed: Aug. 30, 2007

(65) Prior Publication Data

US 2008/0053740 A1 Mar. 6, 2008

(30) Foreign Application Priority Data

Aug. 30, 2006 (GB) ................. 0617052.6

(51) Int. Cl.
*B62D 5/06* (2006.01)
(52) U.S. Cl. ................... 180/403; 180/402
(58) Field of Classification Search ............... 180/402, 180/403
See application file for complete search history.

(56) References Cited

U.S. PATENT DOCUMENTS

| 4,736,811 | A | * | 4/1988 | Marsden et al. | 180/406 |
|---|---|---|---|---|---|
| 4,940,105 | A | * | 7/1990 | Matsunaga et al. | 180/404 |
| 5,273,129 | A | * | 12/1993 | Wright et al. | 180/407 |
| 5,931,256 | A | * | 8/1999 | Langkamp | 180/422 |
| 6,095,277 | A | * | 8/2000 | Bohner et al. | 180/403 |
| 6,283,243 | B1 | * | 9/2001 | Bohner et al. | 180/406 |
| 6,345,674 | B1 | * | 2/2002 | Easton | 180/6.44 |
| 6,502,661 | B1 | * | 1/2003 | Heitzer | 180/403 |
| 6,547,029 | B2 | * | 4/2003 | Peppler et al. | 180/402 |
| 6,575,263 | B2 | * | 6/2003 | Hjelsand et al. | 180/402 |
| 6,834,261 | B1 | * | 12/2004 | Andonian | 703/7 |
| 6,923,288 | B2 | * | 8/2005 | Szabela | 180/402 |

(Continued)

FOREIGN PATENT DOCUMENTS

GB 2341586 3/2000

(Continued)

OTHER PUBLICATIONS

Search Report for Application No. GB0617052.6 dated Nov. 22, 2006.

*Primary Examiner*—Kevin Hurley
*Assistant Examiner*—Michael R Stabley

(57) ABSTRACT

A vehicle steer by wire system which has a steering wheel for setting a desired turn angle of a vehicle wheel, a steering wheel turn sensor for sensing the desired turn angle, a hydraulic steering actuator for turning the wheel, a wheel turn sensor for sensing the current wheel turn angle and a control unit for receiving the desired turn angle and current wheel turn angle signals. An electronically controlled steering actuator control valve means is provided for supplying pressurized fluid to the steering actuator via a steering circuit in response to signals from the control unit to turn the wheel to the desired turn angle. A hydraulic motor connected with the steering wheel is provided to provide steering feedback to the steering wheel via a feedback circuit which includes an electrically controlled hydraulic feedback control valve means which directs fluid to and from the hydraulic motor in response to the signals from the control unit to generate the steering feedback. The steering system has a fail-safe mode in which fluid pressure from the hydraulic motor provides steering of the wheel in the event of a failure to electronically actuate the steering actuator control valve means.

14 Claims, 2 Drawing Sheets

U.S. PATENT DOCUMENTS

| | | | |
|---|---|---|---|
| 6,923,289 B1 * | 8/2005 | MacLeod et al. | 180/403 |
| 6,923,290 B1 * | 8/2005 | MacLeod et al. | 180/403 |
| 6,973,989 B2 * | 12/2005 | Williams | 180/402 |
| 7,055,643 B2 * | 6/2006 | Williams et al. | 180/421 |
| 7,055,644 B2 * | 6/2006 | Merz | 180/428 |
| 7,070,019 B2 * | 7/2006 | Takamoto et al. | 180/403 |
| 7,311,172 B2 * | 12/2007 | Kuhn et al. | 180/402 |
| 7,428,944 B2 * | 9/2008 | Gerum | 180/422 |
| 2002/0157894 A1 * | 10/2002 | Hjelsand et al. | 180/446 |
| 2003/0141134 A1 * | 7/2003 | Sherwin et al. | 180/402 |
| 2006/0042858 A1 * | 3/2006 | Boyle et al. | 180/402 |
| 2006/0207821 A1 * | 9/2006 | Breuning et al. | 180/305 |
| 2008/0230300 A1 * | 9/2008 | Hara et al. | 180/402 |
| 2008/0289897 A1 * | 11/2008 | Williams | 180/402 |

FOREIGN PATENT DOCUMENTS

GB     2341587     3/2000

* cited by examiner

VEHICLE STEERING SYSTEMS

BENEFIT CLAIM

This application is based on, and claims the benefit of priority to, UK application GB 0617052.6, filed 30 Aug. 2006, which priority application is hereby incorporated by reference.

BACKGROUND OF THE INVENTION

1. Field of the Invention

This invention relates to vehicle steering systems, and in particular to such systems which are suitable for use on a tractor or similar utility vehicle.

2. Description of Related Art

It is well known in such vehicles to steer the vehicle using a hydraulically operated steering actuator which is supplied with pressurized fluid from a pressurized source to provide power assisted steering. One of the problems of such systems is that the system provides relatively little steering feedback to the driver and this is particularly disadvantageous when the vehicle is being driven at higher speeds. Also such systems often use expensive proprietary power steering units.

It is an object of the present invention to provide an improved vehicle steering system which is suitable for use on tractors or other similar utility vehicles.

BRIEF SUMMARY OF THE INVENTION

Thus according to the present invention there is provided a vehicle steer by wire system comprising:

a steering wheel for setting a desired turn angle of a vehicle wheel;

a steering wheel turn sensor for sensing the desired turn angle;

a hydraulic steering actuator for turning the wheel;

a wheel turn sensor for sensing the current wheel turn angle;

a control unit for receiving the desired turn angle and current wheel turn angle signals;

an electronically controlled steering actuator control valve means for supply pressurized fluid to the steering actuator via a steering circuit in response to signals from the control unit to turn the wheel to the desired turn angle;

a hydraulic motor connected with the steering wheel to provide steering feedback to the steering wheel via a feedback circuit; and an electrically controlled hydraulic feedback control valve means which directs fluid to and from the hydraulic motor in response to the signals from the control unit to generate the steering feedback;

the steering system being arranged to have a fail-safe mode in which fluid pressure from the hydraulic motor provides steering of the wheel in the event of a failure to electronically actuate the steering actuator control valve means.

The electrically controlled hydraulic feedback control valve means preferably comprises a proportional pressure control valve means which regulates the pressure supplied to the motor, and hence the level of steering feedback, depending on the level of feedback signal received from the control unit.

Preferably the pressure from the electrically controlled hydraulic feedback control valve means is passed to the steering motor via a switching valve means which is held in an open position, to supply the proportional feedback pressure to the hydraulic motor, by an electrical signal received from the control unit and is biased to a switching position, the hydraulic motor being hydraulically connected with the steering actuator via the switching valve means to provide the direct manual steering of the wheel when the electrical signal is not present.

Alternatively, in the event of a failure of the system to electronically actuate the steering actuator control valve means, a further steering actuator control valve means is actuated by hydraulic pressure generated by the hydraulic motor to supply pressurized fluid to the steering actuator. In such an arrangement the further steering actuator control valve means may be supplied with pressure to operate the steering actuator via a connecting valve which is normally held closed by a signal from the control unit but is biased to an open position to supply the steering actuator if the signal form the control unit is not present.

Preferably the steering motor is supplied with pressurized fluid via separate left and right turn connections, each connection being supplied via a separate supply line which includes its own proportional pressure control valve means.

Preferably, each connection also includes a locking valve controlled by the control unit which locks the flow of fluid from the hydraulic motor down the connection to prevent the turning of the associated steering wheel in the direction which generates the locked flow when the steering actuator reaches a predetermined end position or encounters a temporary obstruction to turning.

Preferably also the steering actuator control valve means is a three position valve which has a closed position, a left turn position and a right turn position, the three position valve being biased to its closed position and being moveable to its left and right turn positions in response to electrical signals received from the control unit. Such an arrangement is particularly advantageous as it avoids the need to use a relatively expensive power steering unit.

The steering system may also include a shock protection valve means which limits the maximum level of pressure which can be generated in the steering circuit.

BRIEF DESCRIPTION OF THE DRAWINGS

The present invention will now be described, by way of example only, with reference to the accompanying drawings in which.

DETAILED DESCRIPTION OF PREFERRED EMBODIMENTS

Figure 1:
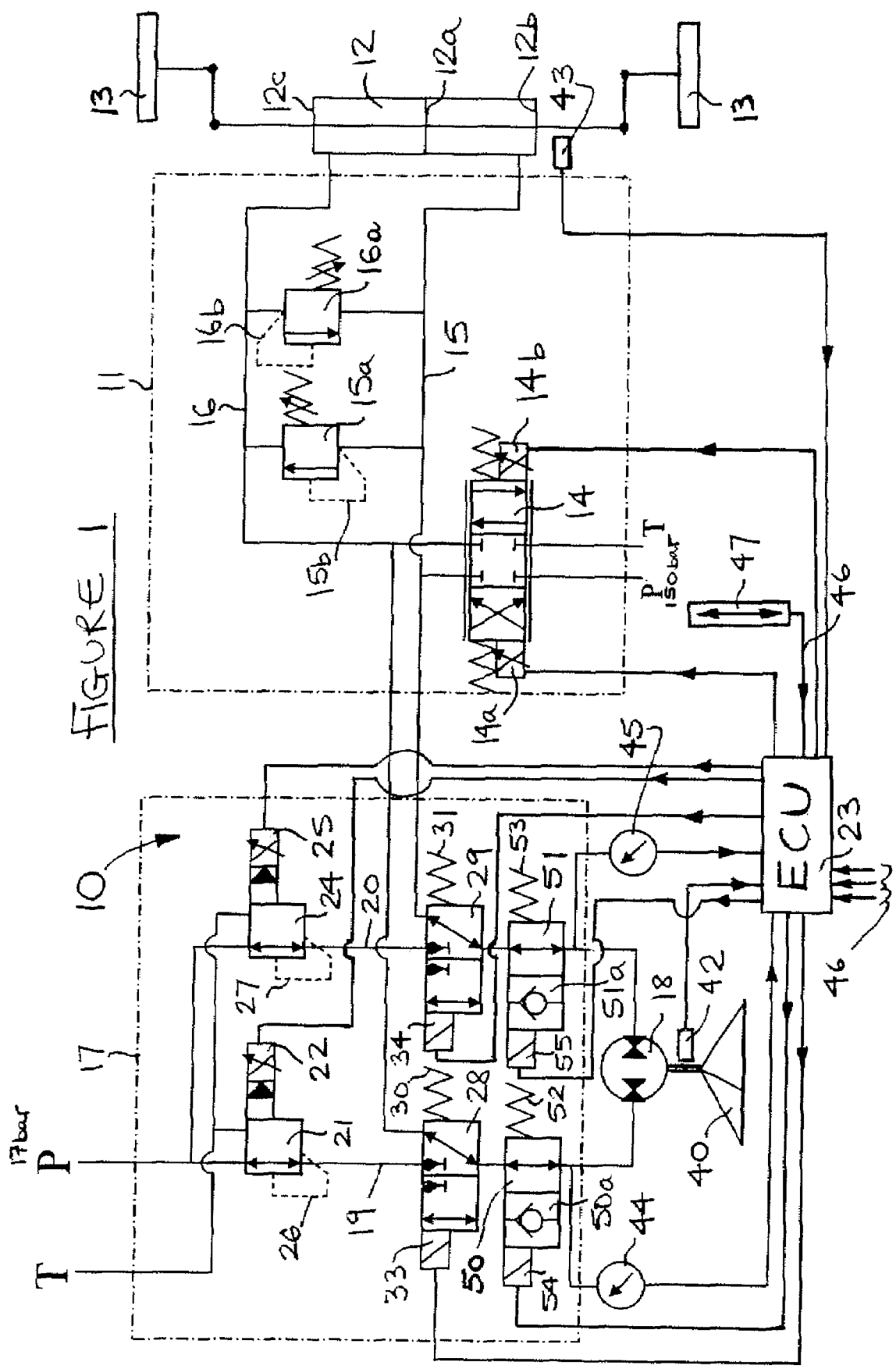
FIG. 1 shows a schematic diagram of a steering system in accordance with the present invention.

Referring to the drawings, a steering system 10 for use in a tractor or similar utility vehicle has a steering circuit 11 which includes a steering actuator 12 connected to a pair of steerable wheels 13 and three position steering valve 14 which supplies pressurized fluid to the right and left hand turn lines 15 and 16 of the circuit from a source of pressurized fluid P which has a tank return line T.

Steering valve 14 is controlled by an electronic control unit 23 which receives signals from a sensor 42 associated with a steering wheel 40 and from a sensor 43 associated with actuator 12 which measures the current turn angle of wheels 13. Control unit 23 issues control signals to the solenoids 14a and 14b of steering valve 14 to control the supply of fluid to actuator 12 to turn wheels 13 to the desired turn angle set by the driver using steering wheel 40. The steering circuit also includes shock protection valves 15a and 16a, associated with lines 15 and 16 respectively, which control the maximum pressure which can be generated in the steering circuit to protect the circuit and the mechanical steering components from damage. This shock protection is provided by feedback loops 15b and 16b respectively.

The steering system also includes a feedback circuit 17 which provides pressurized fluid to a hydraulic motor 18 connected with the steering wheel 40 from the power source P. Pressurized fluid is supplied to motor 18 via left and right turn lines 19 and 20 respectively. Line 19 includes a proportional pressure control valve 21 which is operated by a solenoid 22 which receives an actuating signal from an electronic control unit 23. Similarly line 20 contains a proportional pressure control valve 24 which has a solenoid 25 which is again connected to the electronic control unit 23. The pressure provided to lines 19 and 20 via valves 21 and 24 is arranged to be proportional to the signal supplied to their respective solenoids 22 and 25. Valves 21 and 24 limit the level of pressure which can be applied to the motor 18 from the power source P. This is achieved by feedback loops 26 and 27 which feedback the pressure in lines 19 and 20 onto the spools of valves 21 and 24 respectively. This feedback pressure opposes the force applied to the spools by the system so that these opposing forces balance when the pressures in lines 19 and 20 reach the level commanded by the system.

Each line 19 and 20 also includes a switching valve 28, 29 respectively. These valves are biased by spring loading 30, 31 respectively to the positions shown in FIG. 1 in which the flow of fluid from the source P to the motor 18 is cut-off and the motor is connected to the steering actuator 12 via lines 32 as will be described below in further detail. Valves 28 and 29 have solenoids 33 and 34 respectively which are again connected with electronic control unit 23. When the solenoids are energized by the control unit 23 the valves 28 and 29 move to their alternative position in which the pressure source P is connected with the motor 18.

The pressure applied to the motor 18 via valves 21 and 24 is used to apply a feedback force to the steering wheel 40 to provide the vehicle driver with appropriate steering feedback. This level of steering feedback is determined by electronic control unit 23 which can operate in accordance with a number of predetermined algorithms.

The system also includes locking valves 50 and 51 between the switching valves 28 and 29 and the motor 18. These valves are spring loaded to the open position shown in FIG. 1 by springs 52 and 53 respectively but can each be moved to their respective closed position by actuation of the respective solenoid 54 and 55 by the control unit 23. The locking valves 50 and 51 are used to lock the steering wheel 40 against further movement by the driver when the piston 12a of the actuator 12 reaches either of its end travel positions and also should the pressure P provided to actuator 12 temporarily not be sufficient to turn the wheels any further at that moment.

For example, when the piston 12a reaches the end, 12b of cylinder 12, which is actioned by the anti-clockwise turning of wheel 40, this is indicated by sensor 43 and the locking valve 50 is moved to its closed position by actuation of solenoid 54 by the control unit 23. This means that the driver can no longer continue to turn the wheel anti-clockwise although the wheel can be turned clockwise, to move piston towards the end 12c of cylinder 12, due to the fact that locking valve S1 is still open and fluid can also flow through 9 return valve function 50a of valve 50.

Similarly, when the piston 12a reaches the end 12c of cylinder 12, caused by the clockwise turning of wheel 40, this is detected by sensor 43 and the locking valve 51 is closed by the actuation of solenoid 55 by the control unit 23. This stops further clockwise turning of wheel 40 although the wheel can be turned anti-clockwise, to move the piston towards the end 12b of cylinder 12, since locking valve 50 is open and fluid can flow through a return valve function 51a of valve 51.

As indicated above, a similar locking function occurs if the pressure P provided to the cylinder 12 is insufficient to turn the wheels due to a temporary condition such as the wheels running along a curb or contacting a rock or other obstruction to turning. When this condition arises the error between the turn angle set by steering wheel 40 (which is sensed by sensor 42) and the actual steering angle achieved by cylinder 12 (which is sensed by sensor 43) exceeds a predetermined threshold value and the appropriate locking valve 50 or 51 is closed until the pressure P is again capable of moving the wheels in the direction set by the wheel 40 whereupon the position error threshold is no longer exceeded and the closed locking valve is again opened to resume normal steering operation.

As will be appreciated, since there is no fixed connection between the steering wheel 40 and the valve 14 the steering ratio between the angle of turn of wheel 40 and the turn angle achieved by the actuator 12 can be varied. For example, when the vehicle is being driven at higher speeds on the road this steering ratio may be relatively large (e.g. four turns lock to lock) but at lower speeds and in the field this ratio may be smaller (e.g. 2 turns lock to lock).

Typically the electronic control unit 23 receives inputs from a plurality of vehicle operating parameters. For example, the angle of turn desired by the vehicle driver is measured by sensor 42 which measures the turn angle of wheel 40. Unit 23 also receives signals from sensor 43 which measures the current turn angle of the associated wheels 13. The pressures in lines 19 and 20 are monitored by pressure sensors 44 and 45 respectively which are again connected with unit 23. Other vehicle operating parameters, such as vehicle speed and vehicle transverse acceleration (measured by accelerometer 47) may be measured and fed into the electronic control unit 23 by lines 46.

Typically the electronic control unit 23 operates in accordance with an algorithm which determines the feedback force applied to motor 18 in response to signals indicative of the current wheel turn angle (from sensor 43) and the speed of the vehicle. Alternatively, the algorithm may vary the feedback force in accordance with the transverse acceleration of the vehicle.

Additionally, the electronic control unit may receive a signal indicative of the fact of the tractor is turning on head land and therefore requires to turn quickly, in order to decrease the steering feedback force to achieve this quicker turning. This head land turning signal could be derived from a signal indicating that the implement hitch of the tractor has been raised to the transport position in association with the application of a high turn angle through the steering wheel 40.

In another variation of the standard algorithm, the electronic control unit 23 may receive a signal indicating the that tractor is operating in the fields (again received, for example, from the position of the tractor hitch) and when in receipt of this field operating signal the electronic control unit may deactivate the solenoids 33 and 34 to disconnect the motor 18 from the power source P so that no steering feedback is provided during field use.

As indicated above, if the control unit 23 does not provide a signal to solenoids 33 and 34 the motor 18 is connected directly with the steering actuator 12 so that turning of the steering wheel 40 produces movement of fluid via lines 32 into actuator 12 to provide a direct manual steering function.

This therefore provides an important emergency back-up should there be a failure of the system which prevents the generation of actuation signals by the control unit 23.

Figure 2:
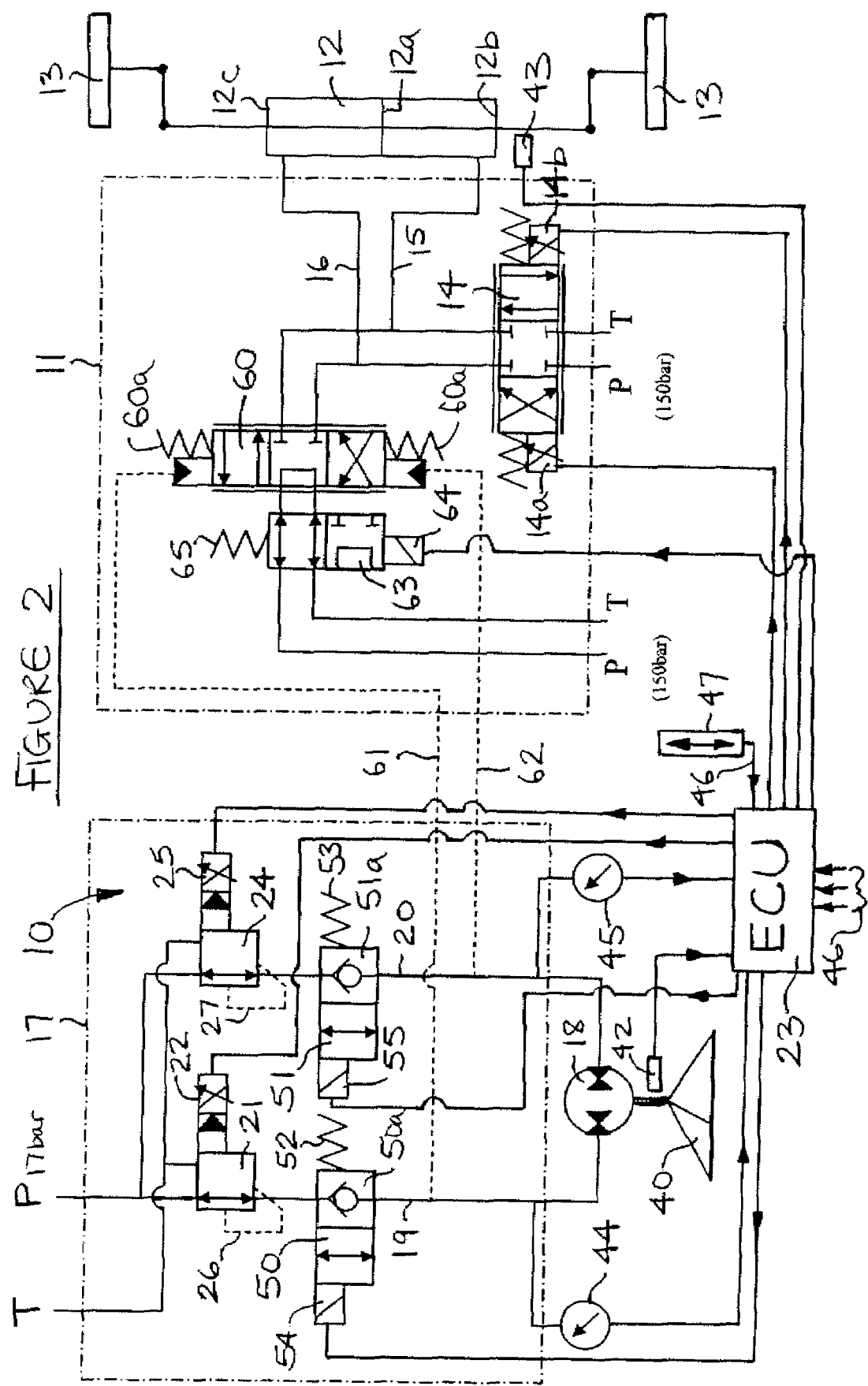
FIG. 2 show a schematic diagram of an alternative steering system in accordance with the present invention.

There are many ways to achieve the control of the steering cylinder 12 by the motor 18 when a failure occurs. FIG. 2 shows an alternative arrangement in which, instead of using the switching valves 28 and 29 to directly connect the motor 40 with the cylinder 12 to move the piston 12a, an additional steering valve 60 is provided which is pilot operated by the pressure from lines 19 and 20 and connections 61 and 62 to act as an alternative route for the pressure P to be supplied to cylinder 12 if a failure has prevented valve 14 operating cylinder 12. Valve 60 is normally biased to its centre closed position by springs 60a. Valve 60 is supplied with the pressure P in the event of a failure via a connecting valve 63 which is normally held closed by a signal to its solenoid 64 from control unit 23 but which is opened by a spring 65 if a failure occurs. As will be appreciated, since in FIG. 2 the motor 40 only acts as a pilot to operate valve 60, the operator is not required to physically generate the power necessary to move piston 12a. This power comes from the pressure source P.

The alternative shown in FIG. 2 is just one example of a system which includes some level of redundancy to protect the steering function in the event of a system failure. As will be appreciated the system may include a duplicate source of pressure, for example from a pump powered by movement of the vehicle, duplicate control valves and even a duplicate electronic control unit.

The steer by wire system of the present invention offers many advantages over a conventional totally hydraulic system. For example, there is no need for an expensive power steering unit. Also the system is particularly suitable for automatic steering via a GPS system since the control unit 23 can be connected to the GPS system so that the unit 23 can issue the necessary steering signals to achieve the desired GPS controlled steering path. There is also no need for a conventional steering column and the system can easily be used with a second steering wheel or joystick mounted at the rear of the tractor for reverse steering. Further the steering ratio can easily be varied in different tractor operating conditions or tasks.

We claim:

1. A vehicle steer by wire system comprising:
   a steering wheel (40) for setting a desired turn angle of a vehicle wheel (13);
   a steering wheel turn sensor (42) for sensing the desired turn angle;
   a hydraulic steering actuator (12) for turning the wheel;
   a wheel turn sensor (43) for sensing the current wheel turn angle;
   a control unit (23) for receiving the desired turn angle and current wheel turn angle signals;
   an electronically controlled steering actuator control valve means (14) for supply pressurized fluid to the steering actuator (12) via a steering circuit in response to signals from the control unit (23) to turn the wheel to the desired turn angle;
   a hydraulic motor (18) connected with the steering wheel (40) to provide steering feedback to the steering wheel via a feedback circuit (17); and
   an electrically controlled hydraulic feedback control valve means (21, 24) which directs fluid to and from the hydraulic motor (18) in response to the signals from the control unit to generate the steering feedback;
   the steering system being arranged to have a fail-safe mode in which fluid pressure from the hydraulic motor (18) provides steering of the wheel (13) in the event of a failure to electronically actuate the steering actuator control valve means (14).

2. A system according to claim 1 in which the electrically controlled hydraulic feedback control valve means is a proportional pressure control valve means (21, 24) which regulates the pressure supplied to the motor (18), and hence the level of steering feedback, depending on the level of feedback signal received from the control unit (23).

3. A system according to claim 1 in which the pressure from the electrically controlled hydraulic feedback control valve means (21, 24) is passed to the steering motor (18) via a switching valve means (28, 29) which is held in an open position, to supply the proportional pressure to the hydraulic motor, by an electrical signal received from the control unit (23) and is biased (30, 31) to a switching position, the hydraulic motor (18) being hydraulically connected with the steering actuator (12) via the switching valve means (28, 29) to provide the direct manual steering of the wheel (13) when the electrical signal is not present.

4. A system according to claim 1 in which, in the event of the failure of the system (23) to electronically actuate the steering actuator control valve means (14), a further steering actuator control valve means (60) is actuated by hydraulic pressure generated by the hydraulic motor (18) to supply pressurized fluid to the steering actuator (12).

5. A system according to claim 4 in which the further steering actuator control valve means (60) is supplied with pressure to operate the steering actuator (12) via a connecting valve (63) which is normally held closed by a signal from the control unit (23) but is biased to an open position to supply the steering actuator (12) if the signal form the control unit is not present.

6. A system according to of claim 1 in which the steering motor (18) is supplied with pressurized fluid via separate left and right turn connections, each connection being supplied via a separate supply line (19, 20) which includes its own proportional pressure control valve means (21, 24).

7. A system according to claim 6 in which each connection also includes a locking valve (50, 51) controlled by the control unit (23) which locks the flow of fluid from the hydraulic motor down the connection to prevent the turning of the associated steering wheel (40) in the direction which generates the locked flow when the steering actuator reaches a predetermined end position or encounters a temporary obstruction to turning.

8. A system according to claim 1 in which the steering actuator control valve means (14) is a three position valve which has a closed position, a left turn position and a right turn position, the three position valve being biased to its closed position and being moveable to its left and right turn positions in response to electrical signals received from the control unit (23).

9. A system according to claim 1 in which the steering circuit includes a shock protection valve means (15a, 16a) which limits the maximum level of pressure which can be generated in the steering circuit.

10. A system according to claim 1 in which the control unit (23) receives a plurality of vehicle performance parameters signals including a signal (43) indicative of current wheel turn angle and processes these signals in accordance with preset algorithms to provide the control signal for the feedback control valve means (21, 24).

11. A system according to claim 10 in which the control unit (23) uses signals (43) indicative of the current wheel turn angle and the speed of the vehicle to provide the control signals for the feedback control valve means (21, 24).

12. A system according to claim 10 in which the control unit (23) uses signals (47) indicative of the transverse acceleration of the vehicle to provide the control signals for the feedback control valve means (21, 24).

13. A system according to claim 10 for use in a tractor in which when the control unit (23) receives a signal indicating that the tractor is turning on a headland and decreases the steering feedback force to allow a quicker turn.

14. A system according to claim 3 for use in a tractor in which when the control unit (23) receives a signal indicating that the tractor is operating in a field the switching valve means (28, 29) operates to isolate the hydraulic motor (18) to turn off the feedback force.

* * * * *